US012598100B2

(12) United States Patent
Oh et al.

(10) Patent No.: US 12,598,100 B2
(45) Date of Patent: Apr. 7, 2026

(54) TRANSMITTER BASED ON RLM COMPENSATION AND OPERATING METHOD THEREOF

(71) Applicant: Samsung Electronics Co., Ltd., Suwon-si (KR)

(72) Inventors: Myeongjin Oh, Suwon-si (KR); Junghoon Chun, Suwon-si (KR); Minsu Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 18/906,291

(22) Filed: Oct. 4, 2024

(65) Prior Publication Data

US 2025/0119326 A1      Apr. 10, 2025

(30) Foreign Application Priority Data

Oct. 5, 2023     (KR) ......................... 10-2023-0132507
Oct. 24, 2023    (KR) ......................... 10-2023-0143169

(51) Int. Cl.
  *H04L 25/49*      (2006.01)
  *H02M 1/088*      (2006.01)
(52) U.S. Cl.
  CPC ........ *H04L 25/4917* (2013.01); *H02M 1/088* (2013.01)
(58) Field of Classification Search
  CPC ... H04L 25/02; H04L 25/0264; H04L 25/028; H04L 25/0282; H04L 25/0286;
  (Continued)

(56) References Cited

U.S. PATENT DOCUMENTS 7,868,667  B2 *   1/2011   Park ................. H03K 19/00323
                                                      327/392
10,044,526 B2 *   8/2018   Kim ................... H04L 25/0272
                   (Continued)

FOREIGN PATENT DOCUMENTS

KR       1020220036386  A      3/2022
KR       1020230057831  A      5/2023
                   (Continued)

OTHER PUBLICATIONS

C. Hyun et al., "A 20Gb/s Dual-Mode PAM4/NRZ Single-Ended Transmitter with RLM Compensation," 2019 IEEE International Symposium on Circuits and Systems (ISCAS), Sapporo, Japan, 2019, pp. 1-4, doi: 10.1109/ISCAS.2019.8702456. (Year: 2019).*

*Primary Examiner* — James M Perez
(74) *Attorney, Agent, or Firm* — Wolf, Greenfield & Sacks, P.C.

(57) ABSTRACT

A transmitter includes a driver including an edge driver that is configured to output a first signal and a fourth signal based on a selection drive signal and a middle driver that is configured to output a second signal and a third signal, a body bias circuit configured to provide the body bias voltage to the middle driver based on a body bias control signal, a control circuit configured to provide the selection drive signal to the driver and to transmit the body bias control signal to the body bias circuit, based on a first comparison result or a second comparison result, and a comparator configured to provide the first comparison result of comparing a level of the second signal with a second level and to provide the second comparison result of comparing a level of the third signal with a third level.

20 Claims, 13 Drawing Sheets

20

(58) Field of Classification Search

CPC ..... H04L 25/0288; H04L 25/38; H04L 25/40; H04L 25/49; H04L 25/4917; H04L 25/4919; H04L 25/4921; H04L 25/4927; H04L 25/4906; H04L 25/4908; H04L 25/4915; H04L 27/02; H04L 27/08; H04L 27/34; H04L 27/36; H04L 27/362; H04L 27/364; H04L 27/366; H04L 27/367; H04L 27/368; H02M 1/08; H02M 1/088

See application file for complete search history.

(56) References Cited

U.S. PATENT DOCUMENTS

| | | | | |
|---|---|---|---|---|
| 10,841,138 | B2 * | 11/2020 | Farzan | H04L 25/0282 |
| 11,146,378 | B2 * | 10/2021 | Kim | H03K 3/037 |
| 11,476,885 | B2 * | 10/2022 | Kang | H04B 1/40 |
| 11,552,833 | B2 * | 1/2023 | Kim | H04L 27/06 |
| 11,587,598 | B2 * | 2/2023 | Um | G11C 29/022 |
| 11,669,448 | B2 * | 6/2023 | Jin | H03K 19/0027 365/185.23 |
| 11,671,292 | B2 * | 6/2023 | Jin | H03F 1/3205 375/300 |
| 11,693,030 | B2 * | 7/2023 | Jin | G01R 1/203 324/750.01 |
| 11,711,245 | B2 * | 7/2023 | Suh | H04L 25/4917 375/233 |
| 11,782,618 | B2 * | 10/2023 | Um | G11C 7/02 326/21 |
| 11,823,615 | B2 * | 11/2023 | Lee | G09G 3/32 |
| 11,888,654 | B2 * | 1/2024 | Kim | H04L 25/03006 |
| 11,972,831 | B2 * | 4/2024 | Rie | G11C 7/1039 |
| 12,126,474 | B2 * | 10/2024 | Kim | H04L 25/4917 |
| 12,166,491 | B2 * | 12/2024 | Fatemi | H04L 7/0334 |
| 12,327,603 | B2 * | 6/2025 | An | G11C 7/1048 |
| 12,375,322 | B2 * | 7/2025 | Xiao | H04L 25/0202 |
| 12,401,553 | B2 * | 8/2025 | Chun | G06F 5/06 |
| 12,451,871 | B2 * | 10/2025 | Chae | H03K 17/6872 |
| 2015/0333753 | A1 * | 11/2015 | Chen | H03K 19/018521 326/30 |
| 2019/0044766 | A1 * | 2/2019 | Lin | G11C 7/1096 |
| 2021/0091922 | A1 * | 3/2021 | Kim | H04L 25/4923 |
| 2021/0226592 | A1 * | 7/2021 | Holzmann | H03F 3/2173 |
| 2021/0297107 | A1 * | 9/2021 | Kang | H03K 5/24 |
| 2022/0068356 | A1 * | 3/2022 | Shin | G11C 7/1087 |
| 2022/0075725 | A1 * | 3/2022 | Jin | G06F 12/0802 |
| 2022/0076716 | A1 * | 3/2022 | Um | G11C 7/1084 |
| 2022/0083244 | A1 * | 3/2022 | Um | G11C 7/1084 |
| 2022/0086028 | A1 * | 3/2022 | Suh | H04L 25/03178 |
| 2022/0123973 | A1 * | 4/2022 | Kim | H04L 25/03866 |
| 2023/0120821 | A1 * | 4/2023 | Rie | G11C 5/063 365/207 |
| 2023/0164009 | A1 * | 5/2023 | Kim | H04L 25/03878 375/262 |
| 2023/0171132 | A1 * | 6/2023 | Kim | G01R 31/31703 375/340 |
| 2023/0238949 | A1 * | 7/2023 | Manjunath | H03K 19/17744 332/109 |
| 2023/0344417 | A1 * | 10/2023 | Chae | H03K 3/012 |
| 2024/0097877 | A1 * | 3/2024 | Tierno | H04L 25/4917 |
| 2024/0103564 | A1 * | 3/2024 | Chun | G06F 5/06 |
| 2025/0119326 | A1 * | 4/2025 | Oh | H04L 25/4917 |
| 2025/0293598 | A1 * | 9/2025 | Noh | G06F 1/28 |
| 2025/0323810 | A1 * | 10/2025 | Park | H04L 25/4917 |
| 2025/0337326 | A1 * | 10/2025 | Mertens | H02M 3/158 |

FOREIGN PATENT DOCUMENTS

| | | | |
|---|---|---|---|
| KR | 1020230057832 | A | 5/2023 |
| KR | 1020230057833 | A | 5/2023 |

* cited by examiner

Figure 5B:
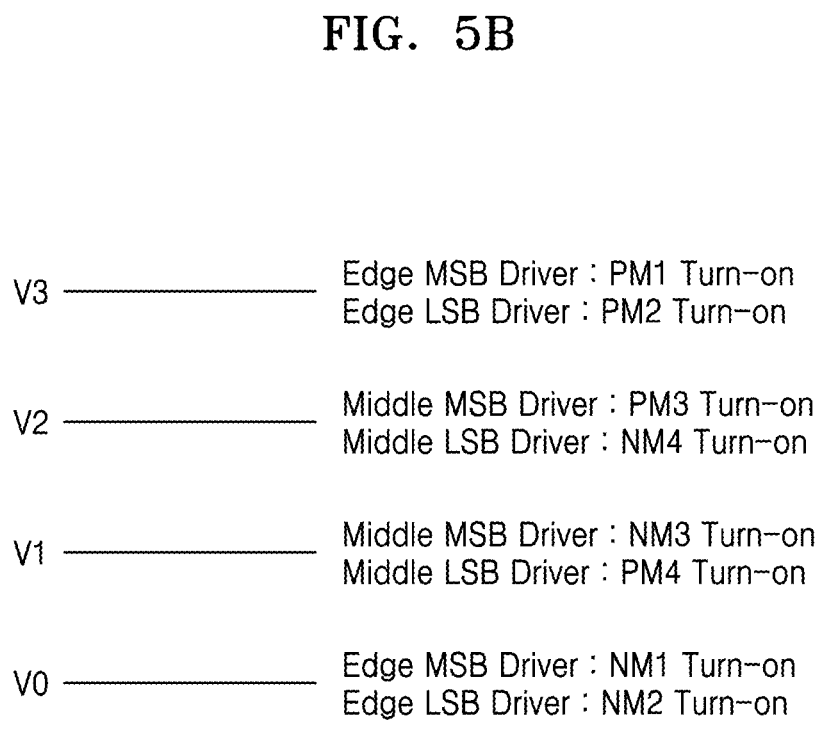

V3 ——————— Edge MSB Driver : PM1 Turn-on
Edge LSB Driver : PM2 Turn-on

V2 ——————— Middle MSB Driver : PM3 Turn-on
Middle LSB Driver : NM4 Turn-on

V1 ——————— Middle MSB Driver : NM3 Turn-on
Middle LSB Driver : PM4 Turn-on

V0 ——————— Edge MSB Driver : NM1 Turn-on
Edge LSB Driver : NM2 Turn-on

<u>103</u>

201

TRANSMITTER BASED ON RLM COMPENSATION AND OPERATING METHOD THEREOF

CROSS-REFERENCE TO RELATED APPLICATIONS

This application is based on and claims priority under 35 USC § 119 to Korean Patent Application Nos. 10-2023-0132507, filed Oct. 5, 2023, and 10-2023-0143169, filed Oct. 24, 2023, in the Korean Intellectual Property Office, the disclosures of which are incorporated by reference herein in their entireties.

BACKGROUND

Embodiments of the inventive concept relate to a transmitter, and more particularly, to a method of improving the performance of a transmitter that transmits multi-level signals.

The demand for improved bandwidth has rapidly increased in wired and wireless communications. However, there is a limit to increasing bandwidth, and thus, a method of transmitting multi-level signals, such as pulse amplitude modulation 4-level (PAM4), instead of transmitting non-return to zero (NRZ) signals, has come to prominence. Recently, the PAM4 method has been actively studied as one of the signaling methods for high-capacity and high-speed data transmission.

SUMMARY

Embodiments of the inventive concept provide a method of improving the performance of a transmitter that transmits multi-level signals by correcting the discrepancy in intervals between signal levels of a pulse amplitude modulation 4-level (PAM4) method.

According to an aspect of the inventive concept, there is provided a pulse amplitude modulation 4-level transmitter including a driver including an edge driver that is configured to output a first signal and a fourth signal based on a selection drive signal and a middle driver that is configured to output a second signal and a third signal based on the selection drive signal and a body bias voltage, a body bias circuit configured to provide the body bias voltage to the middle driver based on a body bias control signal, a control circuit configured to provide the selection drive signal to the driver and to transmit the body bias control signal to the body bias circuit, based on a first comparison result or a second comparison result, and a comparator configured to provide the first comparison result of comparing a level of the second signal with a second level and to provide the second comparison result of comparing a level of the third signal with a third level. The edge driver includes an edge most significant bit (MSB) driver and an edge least significant bit (LSB) driver, and the middle driver includes a middle MSB driver and a middle LSB driver.

According to another aspect of the inventive concept, there is provided a pulse amplitude modulation 4-level transmitter including a driver including an edge driver configured to output a first signal and a fourth signal based on a selection drive signal and including an edge most significant bit (MSB) driver and an edge least significant bit (LSB) driver and a middle driver configured to output a second signal and a third signal based on the selection drive signal and one or more body bias voltages and including a middle MSB driver and a middle LSB driver, a body bias circuit configured to provide, to the middle driver, a first body bias voltage and a second body bias voltage based on a first body bias control signal, a control circuit configured to provide the selection drive signal to the driver and to transmit the first body bias control signal to the body bias circuit based on a first comparison result, and a comparator configured to provide the first comparison result of comparing a level of the second signal with a second level. The first body bias voltage may be applied to a transistor of the middle MSB driver, and the second body bias voltage may be applied to a transistor of the middle LSB driver. The driver may be configured to select the middle MSB driver and the middle LSB driver based on the selection drive signal and to output the second signal based on the first body bias voltage and the second body bias voltage.

According to another aspect of the inventive concept, there is provided a pulse amplitude modulation 4-level transmitter including a driver including an edge driver configured to output a first signal and a fourth signal based on a selection drive signal and including an edge most significant bit (MSB) driver and an edge least significant bit (LSB) driver and a middle driver configured to output a second signal and a third signal based on the selection drive signal and one or more body bias voltages and including a middle MSB driver and a middle LSB driver, a body bias circuit configured to provide, to the middle driver, a first body bias voltage and a second body bias voltage based on a body bias control signal, a control circuit configured to provide the selection drive signal to the driver and to transmit the body bias control signal to the body bias circuit based on a comparison result, and a comparator configured to provide the comparison result of comparing a level of the third signal with a third level. The first body bias voltage may be applied to a transistor of the middle MSB driver, and the second body bias voltage may be applied to a transistor of the middle LSB driver. The driver may be configured to select the middle MSB driver and the middle LSB driver based on the selection drive signal and to output the second signal based on the first body bias voltage and the second body bias voltage.

BRIEF DESCRIPTION OF THE DRAWINGS

Embodiments will be more clearly understood from the following detailed description taken in conjunction with the accompanying drawings in which:

FIG. 5B illustrates levels of output signals of the transmitter of FIG. 5A and transistors turned on at each signal level according to an embodiment;

DETAILED DESCRIPTION OF THE EMBODIMENTS

Figure 1:
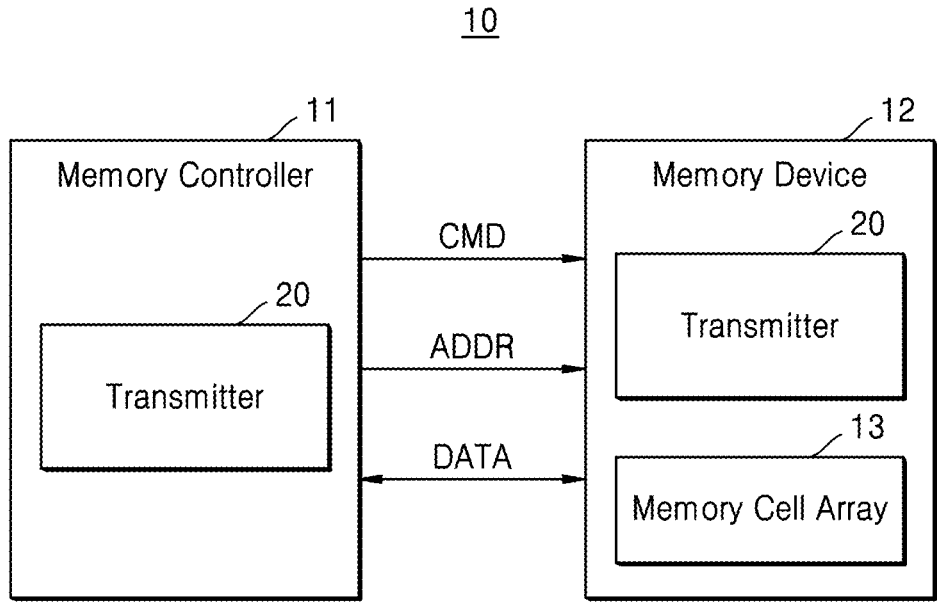
FIG. 1 is a block diagram schematically illustrating a memory system according to an embodiment of the disclosure.

Hereinafter, example embodiments will be explained in detail with reference to the accompanying drawings. The same reference numerals are used for the same components in the drawings, and duplicate descriptions thereof are omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a block diagram schematically illustrating a memory system 10 according to an embodiment of the disclosure.

Referring to FIG. 1, the memory system 10 may include a memory controller 11 and a memory device 12. In an embodiment, the memory system 10 may be implemented as one chip, one semiconductor package, or one module. In some embodiments, each of the memory controller 11 and the memory device 12 may be implemented as one chip, one semiconductor package, or one module. The memory system 10 may be used as a storage medium for an external device (e.g., a host, application processor, etc.). The memory system 10 may be a high-capacity storage medium, such as a memory card, memory stick, or solid state drive (SSD).

The memory controller 11 may control the memory device 12 responsive to control by an external device. The memory controller 11 may transmit an address ADDR and a command CMD to the memory device 12 or may transmit and receive data to and from the memory device 12.

The memory device 12 may include a memory cell array 13 and a transmitter 20. The memory cell array 13 may include a plurality of memory cells. In an embodiment, the memory cell array 13 may include a NAND flash memory cell array or a NOR flash memory cell array. In addition, the memory cells of the memory cell array 13 may include resistive memory cells, such as resistive random access memory (RRAM) memory cells, phase change RAM (PRAM), or magnetic RAM (MRAM) memory cells, or nonvolatile memory cells, such as a dynamic RAM (DRAM) memory cells.

The memory cell array 13 may be connected to an address decoder through word lines WLs, string select lines SSLs, and ground select lines GSLs, and may be connected to a page buffer circuit via bit lines BLs. The memory cell array 13 may include a plurality of memory blocks. The memory cell array 13 may include a plurality of NAND cell strings. Each NAND cell string may form a channel in a vertical or horizontal direction. The word lines (WLs) may be stacked in the vertical direction in the memory cell array 13. The memory blocks include a plurality of memory cells.

The memory controller 11 may transmit the data DATA to the memory device 12 as output signals in a format using the transmitter 20 according to an embodiment. The memory device 12 may also transmit the data DATA to the memory controller 11 as output signals in a pulse amplitude modulation 4-level (PAM4) format using the transmitter 20 according to an embodiment.

The transmitter 20 according to an embodiment may improve a ratio of level mismatch (RLM) of multi-level signals by using a body bias voltage.

The transmitter 20 according to an embodiment may improve an RLM of a second level signal and a third level signal in a PAM4 using a body bias voltage.

The transmitter 20 according to an embodiment may regulate turn-on resistance of a transistor by regulating a body bias voltage.

The transmitter 20 according to an embodiment may match impedance between the transmitter, channel, and receiver by improving the RLM of the multi-level signals using the body bias voltage.

The transmitter 20 according to an embodiment may use an active device, such as a P-channel metal-oxide semiconductor (PMOS) transistor and/or an N-channel metal-oxide semiconductor (NMOS) transistor, to improve the RLM of multi-level signals.

The transmitter 20 according to an embodiment may use the same transistors as the PMOS transistor and/or NMOS transistor of the existing driver to improve the RLM of multi-level signals.

The transmitter 20 according to an embodiment may improve the RLM for one or more signal levels in a multi-level signal transmission method, such as PAM8, as well as PAM4.

Figure 2:
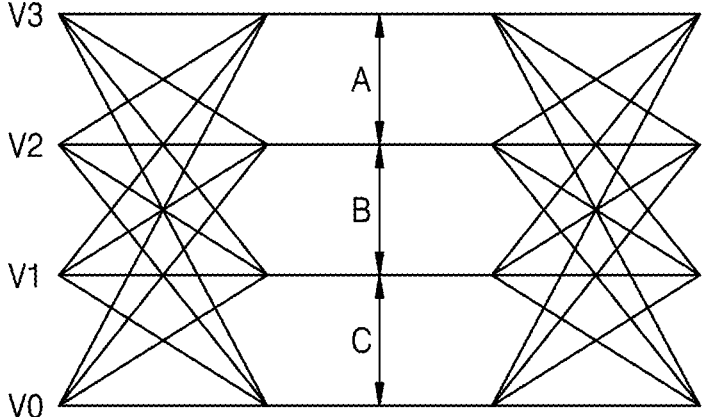
FIG. 2 illustrates output signal levels of a pulse amplitude modulation 4-level (PAM4)-based transmitter.

FIG. 2 shows output signal levels of a PAM4-based transmitter 20.

Referring to FIG. 2, an output signal of the PAM4-based transmitter 20 has four signal levels. In detail, the output signal may have a first signal level V0, a second signal level V1, a third signal level V2, and a fourth signal level V3. Hereinafter, in embodiments of the inventive concept, the first signal level, the second signal level, the third signal level, and the fourth signal level may be understood as referring to the first signal level V0, the second signal level V1, the third signal level V2, and the fourth signal level V3 of the PAM4, respectively. In addition, the first signal level V0 to the fourth signal level V3 may be referred to as the first level V0 to the fourth level V3.

Referring to FIG. 2, A represents a gap between the third signal level V2 and the fourth signal level V3. B represents a gap between the second signal level V1 and the third signal level V3. C represents a gap between the first signal level V0 and the second signal level V1.

The RLM may be expressed as Equation 1 below.

$$RLM = \frac{\min(A, B, C)}{(A + B + C)/3} \qquad \text{[Equation 1]}$$

In Equation 1, A represents the gap between the third signal level V2 and the fourth signal level V3. B represents the interval between the second signal level V1 and the third signal level V2. C represents the interval between the first signal level V0 and the second signal level V1, and min is a function that selects a minimum value. When the RLM is the best, the value may be 1 and the transmitter 20 according to an embodiment may improve the RLM by calibrating the second signal level and the third signal level of the PAM4. For convenience of description, the PAM4 is used as an example, but embodiments of the inventive concept may be applied to improve the RLM generally in a multi-level signal transmission method.

Figure 3:
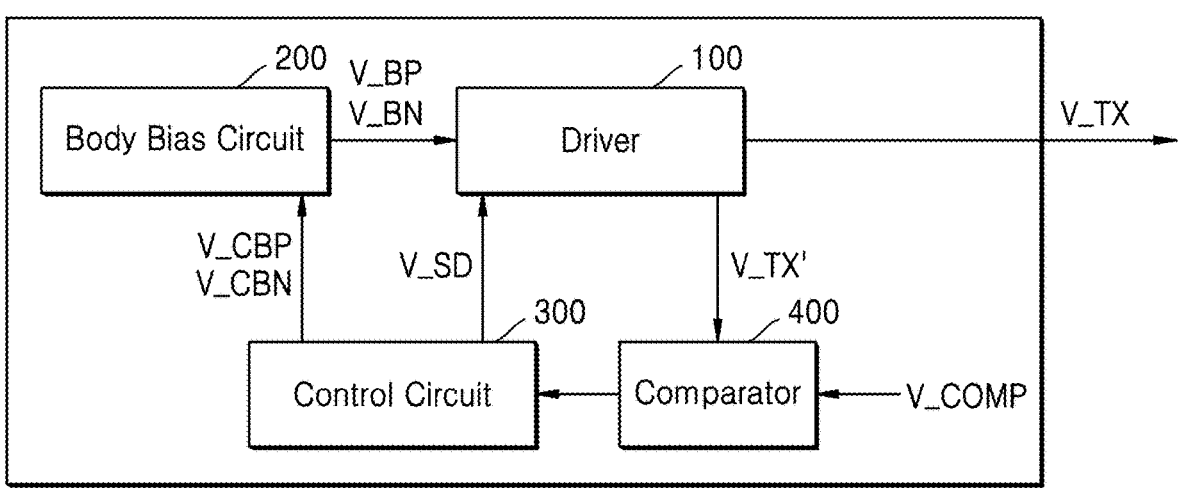
FIG. 3 is a block diagram of a transmitter according to an embodiment of the disclosure.

FIG. 3 is a block diagram of a transmitter 20 according to an embodiment of the disclosure. FIG. 3 may be described with reference to FIG. 2.

Referring to FIG. 3, the transmitter 20 may include a driver 100, a body bias circuit 200, a control circuit 300, and a comparator 400.

According to an embodiment, the comparator 400 may receive an output signal V_TX' from the driver 100. The comparator 400 may receive a comparison signal V_COMP. The comparator 400 may compare the comparison signal V_COMP with the output signal V_TX' and provide a comparison result to the control circuit 300. The comparison signal V_COMP may have one of the second signal level V1 and the third signal level V2 among the output signal levels of the PAM4 method. That is, the comparator 400 may receive the comparison signal V_COMP having one of the first signal level and the second signal level and compare the output signal V_TX' with the comparison signal V_COMP. For example, the comparator 400 may compare the output signal V_TX' with the comparison signal V_COMP having the second signal level V1 and provide a comparison result to the control circuit 300.

As an example, the comparator 400 may provide, to control circuit 300, a comparison result including information that the output signal V_TX' is less than the second signal level V1, information that the output signal V_TX' is greater than the second signal level V1, and information that the output signal V_TX' is equal to the second signal level V1.

As another example, the comparator 400 may provide, to the control circuit 300, a comparison result including information that the output signal V_TX' is less than the third signal level V2, information that the output signal V_TX' is greater than the third signal level V2, and information that the output signal V_TX' is equal to the third signal level V2.

The control circuit 300 may provide body bias control signals V_CBP and V_CBN to the body bias circuit 200 based on the comparison result. In detail, the control circuit 300 may provide, to the body bias circuit 200, the body bias control signals V_CBP and V_CBN for regulating body bias voltages V_BP and V_BN applied to the driver 100 using the comparison result. That is, the control circuit 300 may regulate the body bias voltages V_BP and V_BN using the comparison result.

The body bias voltage V_BP is a voltage applied to a body of the PMOS transistor included in the driver 100. The body bias voltage V_BN is a voltage applied to a body of the NMOS transistor included in the driver 100. The body bias control signal V_CBP is a control signal for the body bias voltage V_BP applied to the body of the PMOS transistor included in the driver 100. The body bias control signal V_CBN is a control signal for the body bias voltage V_BN applied to the body of the NMOS transistor included in the driver 100.

The body bias circuit 200 may provide the body bias voltages V_BP and V_BN to the driver 100. The driver 100 may update the output signal V_TX' using the body bias voltages V_BP and V_BN and output an updated output signal V_TX. The updated output signal V_TX is a signal having an improved RLM compared to the output signal V_TX', and by receiving the updated output signal V_TX, signal distortion at a receiver may be reduced and signal reliability is improved.

Figure 4:
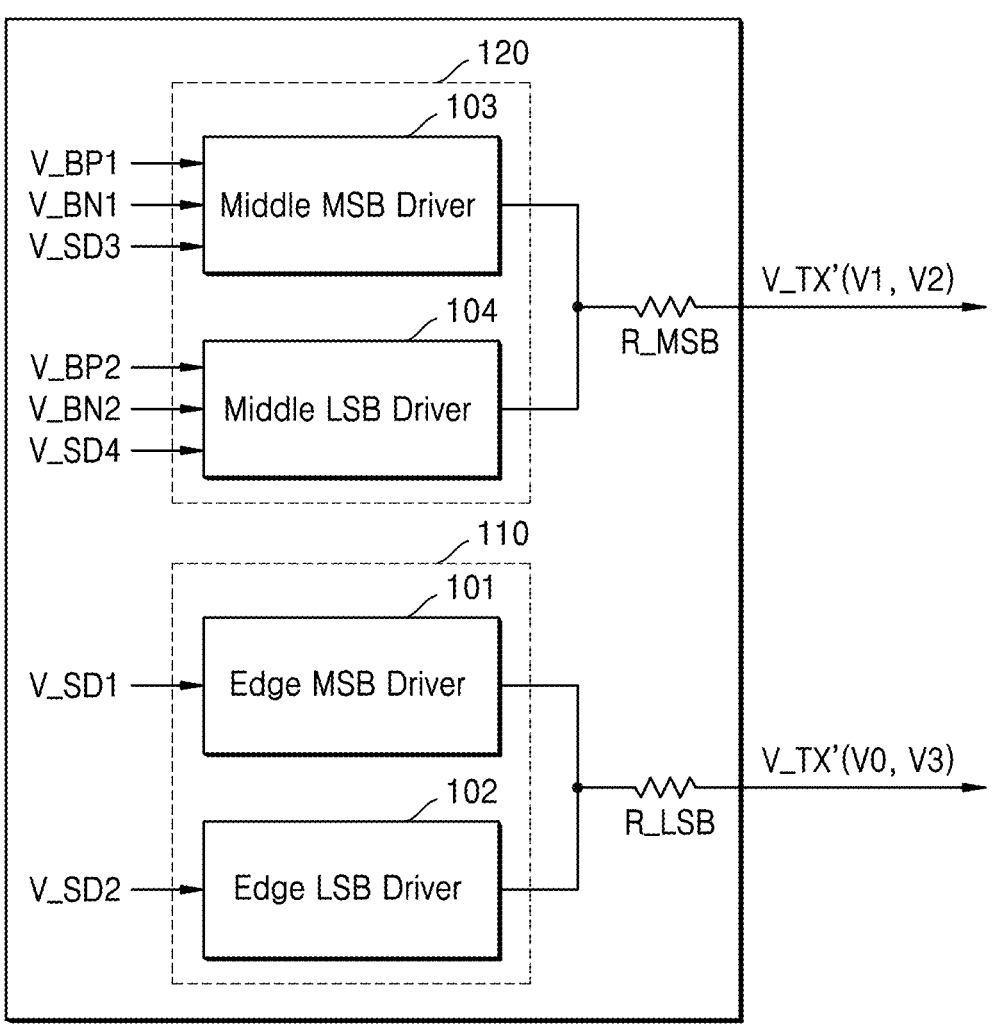
FIG. 4 is a block diagram of a driver according to an embodiment of the disclosure.

FIG. 4 is a block diagram of a driver 100 according to an embodiment. FIG. 4 may be described with reference to FIG. 3 and a redundant description of similar components or operations may be omitted.

Referring to FIG. 4, the driver 100 may include an edge most significant bit (MSB) driver 101, an edge least significant bit (LSB) driver 102, a middle MSB driver 103, and a middle LSB driver 104. In detail, an edge driver 110 may include the edge MSB driver 101 and the edge LSB driver 102. A middle driver 120 may include the middle MSB driver 103 and the middle LSB driver 104.

The edge MSB driver 101 may receive a selection drive signal V_SD from the control circuit 300. For example, the edge MSB driver 101 may receive a first selection drive signal V_SD1 from the control circuit 300. The edge MSB driver 101 may output an MSB portion of the output signal V_TX' of the first signal level V0 or the fourth signal level V3, based on the first selection drive signal V_SD1. In other embodiments, the edge MSB driver 101 may not output a signal based on the first selection drive signal V_SD1.

The edge LSB driver 102 may receive a selection drive signal V_SD from the control circuit 300. For example, the edge LSB driver 102 may receive a second selection drive signal V_SD2 from the control circuit 300. The edge LSB driver 102 may output an LSB portion of the output signal V_TX' of the first signal level V0 or the fourth signal level V3 based on the second selection drive signal V_SD2. In other embodiments, the edge LSB driver 102 may not output a signal based on the second selection drive signal V_D2.

The middle MSB driver 103 may include one or more PMOS transistors and one or more NMOS transistors. The middle MSB driver 103 may receive body bias voltages V_BP and V_BN from the body bias circuit 200. For example, the middle MSB driver 103 may receive a first pull-up voltage V_BP1 by the body of the PMOS transistor. Accordingly, turn-on resistance of the PMOS transistor included in the middle MSB driver 103 may be regulated. The middle MSB driver 103 may receive a first pull-down voltage V_BN1 by the body of the NMOS transistor. Accordingly, turn-on resistance of the NMOS transistor included in the middle MSB driver 103 may be regulated.

In addition, the middle MSB driver 103 may receive the selection drive signal V_SD from the control circuit 300. For example, the middle MSB driver 103 may receive a third selection drive signal V_SD3 from the control circuit 300. The middle MSB driver 103 may output an MSB portion of the output signal V_TX' of the second signal level V1 or the third signal level V2 based on the third selection drive signal V_SD3. In other embodiments, the middle MSB driver 103 may not output a signal based on the third selection drive signal V_D3.

The middle LSB driver 104 may include one or more PMOS transistors and one or more NMOS transistors. The middle LSB driver 104 may receive the body bias voltages V_BP and V_BN from the body bias circuit 200. For example, the middle LSB driver 104 may receive a second pull-up voltage V_BP2 by the body of the PMOS transistor. Accordingly, turn-on resistance of the PMOS transistor included in the middle LSB driver 104 may be regulated. The middle LSB driver 104 may receive a second pull-down voltage V_BN2 by the body of the NMOS transistor. Accordingly, turn-on resistance of the NMOS transistor included in the middle LSB driver 104 may be regulated.

In addition, the middle LSB driver 104 may receive the selection drive signal V_SD from the control circuit 300. For example, the middle LSB driver 104 may receive a fourth selection drive signal V_SD4 from the control circuit 300.

The middle LSB driver 104 may output an LSB portion of the output signal V_TX' of the second signal level V1 or the third signal level V2 based on the fourth selection drive signal V_SD4. Alternatively, the middle LSB driver 104 may not output a signal based on the fourth selection drive signal V_SD4.

Furthermore, the driver 100 may include resistors R_MSB and R_LSB. The output signal V_TX' of the middle MSB driver 103 and the middle LSB driver 104 may refer to a voltage at an output terminal of the resistor R_MSB. The output signal V_TX' of the edge MSB driver 101 and the edge LSB driver 102 may refer to a voltage at an output terminal of the resistor R_LSB.

Figure 5A:
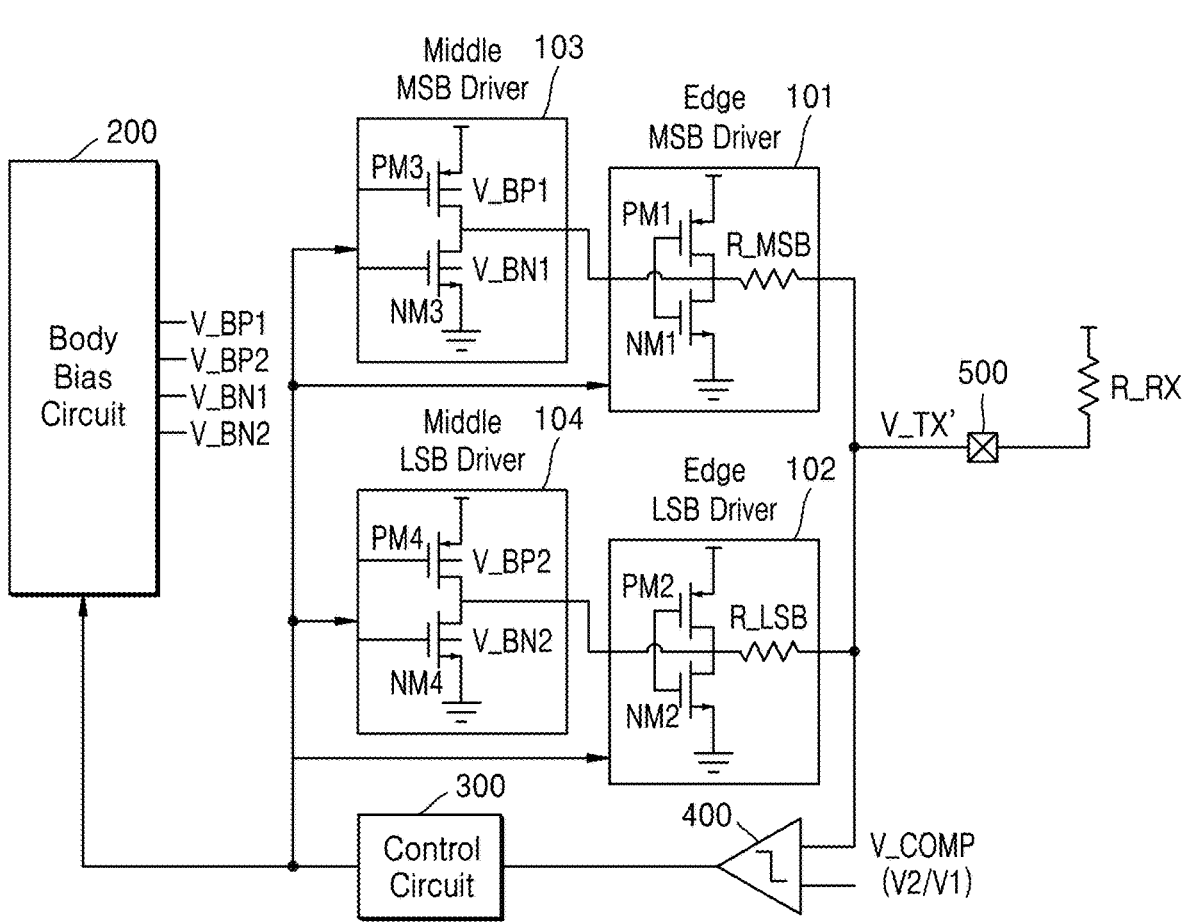
FIG. 5A is a block diagram of a transmitter including a driver circuit, according to an embodiment of the disclosure.

FIG. 5A is a block diagram of the transmitter 20 including a driver circuit according to an embodiment of the disclosure. FIG. 5A may be described with reference to FIGS. 2, 3, and 4.

Referring to FIG. 5A, the transmitter 20 may include the edge MSB driver 101, the edge LSB driver 102, the middle MSB driver 103, the middle LSB driver 104, the body bias circuit 200, the control circuit 300, the comparator 400, and a pad 500. The driver 100 may include the edge driver 110 and the middle driver 120, the edge driver 110 may include the edge MSB driver 101 and the edge LSB driver 102, and the middle driver 120 may include the middle MSB driver 103 and the middle LSB driver 104.

The driver 100 may output a first signal, a second signal, a third signal, and a fourth signal. The first to fourth signals may be PAM4-type signals and may have different voltage levels. The edge driver 110 may output the first signal and the fourth signal based on a selection drive signal.

The middle driver 120 may output the second signal and the third signal based on the selection drive signal and/or the body bias voltages V_BP1, V_BP2, V_BN1, and V_BN2. The body bias voltages V_BP1, V_BP2, V_BN1, and V_BN2 may include a first pull-up voltage V_BP1, a first pull-down voltage V_BN1, a second pull-up voltage V_BP2, and a second pull-down voltage V_BN2.

The comparator 400 may provide the control circuit 300 with a first comparison result of comparing a level of the second signal with the second signal level V1. The comparator 400 may provide the control circuit 300 with a second comparison result of comparing a level of the third signal with the third signal level V2.

The control circuit 300 may provide the selection drive signal to the driver 100. The control circuit 300 may transmit a body bias control signal to the body bias circuit 200, based on the first comparison result and/or the second comparison result.

The body bias circuit 200 may provide the body bias voltages V_BP1, V_BP2, V_BN1, and/or V_BN2 to the middle driver 120 based on the body bias control signal.

The edge MSB driver 101 may include a first PMOS transistor PM1 and a first NMOS transistor NM1. The edge LSB driver 102 may include a second PMOS transistor PM2 and a second NMOS transistor NM2. The middle MSB driver 103 may include a third PMOS transistor PM3 and a third NMOS transistor NM3. The middle LSB driver 104 may include a fourth PMOS transistor PM4 and a fourth NMOS transistor NM4. As an example, the first PMOS transistor PM1 may be identical to the third PMOS transistor PM3. The first NMOS transistor NM1 may be identical to the third NMOS transistor NM3. As an example, the second PMOS transistor PM2 may be identical to the fourth PMOS transistor PM4. The second NMOS transistor NM2 may be identical to the fourth NMOS transistor NM4. That is, the transmitter 20 according to embodiments of the inventive concept may not use a resistor, which is a passive element, to calibrate the second signal and the third signal, but may use PMOS transistors and NMOS transistors that are identical to one or more PMOS transistors and one or more NMOS transistors used for the first signal and the fourth signal.

The middle driver 120 may output the second signal with corrected RLM. In detail, the fourth PMOS transistor PM4 and the third NMOS transistor NM3 may be turned on responsive to the selection drive signal.

For example, the control circuit 300 may input the selection drive signal to a gate terminal of the fourth PMOS transistor PM4, and the fourth PMOS transistor PM4 may be turned on responsive to the selection drive signal. In this case, the fourth NMOS transistor NM4 may be turned off responsive to the selection drive signal. In addition, the control circuit 300 may input the selection drive signal to a gate terminal of the third NMOS transistor NM3, and the third NMOS transistor may be turned on responsive to the selection drive signal. In this case, the third PMOS transistor PM3 may be turned off responsive to the selection drive signal.

In addition, turn-on resistance of the fourth PMOS transistor PM4 may be regulated by applying the second pull-up voltage V_BP2 to the body of the fourth PMOS transistor PM4. By applying the first pull-down voltage V_BN1 to the third NMOS transistor NM3, turn-on resistance of the third NMOS transistor NM3 may be regulated. Accordingly, RLM of the second signal may be corrected. As a result, the middle driver 120 may output the output voltage V_TX' corresponding to the second signal to the pad 500 (an output terminal) using the third NMOS transistor NM3 and the fourth PMOS transistor PM4.

The transmitter 20 may correct the level of the second signal to be close to the second signal level V1 by repeating the above-described operations. For example, the comparator 400 may compare the second signal with the second signal level and provide the first comparison result to the control circuit 300. The control circuit 300 may provide a first body bias control signal to the body bias circuit 200 based on the first comparison result. The body bias circuit 200 may apply the first pull-down voltage V_BN1 to the body of the third NMOS transistor NM3 and apply the second pull-up voltage V_BP2 to the body of the fourth PMOS transistor PM4, based on the first body bias control signal. The middle driver 120 may output the second signal. The transmitter 20 may calibrate the second signal to be close to the second level V1 by repeating the operations described above. For example, when the level of the output voltage V_TX' is greater than the second signal level V1, the control circuit 300 may transmit, to the body bias circuit 200, the body bias control signal indicating an increase in the first pull-down voltage V_BN1 and/or an increase in the second pull-up voltage V_BP2. That is, when the output voltage V_TX' is large, the control circuit 300 may transmit, to the body bias circuit 200, the body bias control signal for decreasing turn-on resistance of the third NMOS transistor NM3 or increasing turn-on resistance of the fourth PMOS transistor PM4. As another example, when the level of the output voltage V_TX' is less than the second signal level V1, the control circuit 300 may transmit, to the body bias circuit 200, the body bias control signal indicating a decrease in the first pull-down voltage V_BN1 and/or a decrease in the second pull-up voltage V_BP2. That is, when the output voltage V_TX' is small, the control circuit 300 may transmit, to the body bias circuit 200, the body bias control signal for increasing turn-on resistance of the third NMOS transistor NM3 or decreasing turn-on resistance of the fourth PMOS transistor PM4. The transmitter 20 may output an updated second signal when the level of the second signal reaches or is sufficiently close to the second signal level V1.

The middle driver 120 may output a third signal with corrected RLM. In detail, the third PMOS transistor PM3 and the fourth NMOS transistor NM4 may be turned on responsive to the selection drive signal.

For example, the control circuit 300 may input the selection drive signal to a gate terminal of the third PMOS transistor PM3, and the third PMOS transistor PM3 may be turned on responsive to the selection drive signal. In this case, the third NMOS transistor NM3 may be turned off responsive to the selection drive signal. In addition, the control circuit 300 may input the selection drive signal to a gate terminal of the fourth NMOS transistor NM4, and the fourth NMOS transistor may be turned on responsive to the selection drive signal. In this case, the fourth PMOS transistor PM4 may be turned off responsive to the selection drive signal.

In addition, by applying the first pull-up voltage V_BP1 to the body of the third PMOS transistor PM3, turn-on resistance of the third PMOS transistor PM3 may be regulated. By applying the second pull-down voltage V_BN2 to the body of the fourth NMOS transistor NM4, turn-on resistance of the fourth NMOS transistor NM4 may be regulated. Accordingly, the RLM of the second signal may be corrected. As a result, the middle driver 120 may output the output voltage V_TX' corresponding to the third signal to the pad 500 (an output terminal) using the fourth NMOS transistor NM4 and the third PMOS transistor PM3.

The transmitter 20 may correct the level of the third signal to be close to the third signal level V2 by repeating the above-described operations. For example, the comparator 400 may compare the third signal with the third signal level V2 and provide the second comparison result to the control circuit 300. The control circuit 300 may provide a second body bias control signal to the body bias circuit 200 based on the second comparison result. The body bias circuit 200 may apply the second pull-down voltage V_BN2 to the body of the fourth NMOS transistor NM4 and apply the first pull-up voltage V_BP1 to the body of the third PMOS transistor PM3, based on the second body bias control signal. The middle driver 120 may output the third signal. The transmitter 20 may calibrate the third signal to be close to the third signal level V2 by repeating the operations described above. For example, when the level of the output voltage V_TX' is greater than the third level V2, the control circuit 300 may transmit, to the body bias circuit 200, the body bias control signal indicating an increase in the second pull-down voltage V_BN2 and/or an increase in the first pull-up voltage V_BP1. That is, when the output voltage V_TX' is large, the control circuit 300 may transmit, to the body bias circuit 200, the body bias control signal for decreasing turn-on resistance of the fourth NMOS transistor NM4 or increasing turn-on resistance of the third PMOS transistor PM3. As another example, when the level of the output voltage V_TX' is less than the third signal level V2, the control circuit 300 may transmit, to the body bias circuit 200, the body bias control signal indicating a decrease in the second pull-down voltage V_BN2 and/or a decrease in the first pull-up voltage V_BP1. That is, when the output voltage V_TX' is small, the control circuit 300 may transmit, to the body bias control signal 200, the body bias control signal for increasing the turn-on resistance of the fourth NMOS transistor NM4 or decreasing the turn-on resistance of the third PMOS transistor PM3. The transmitter 20 may output an updated third signal when the level of the third signal reaches or is sufficiently close to the third signal level V2.

FIG. 5B shows the levels of the output signal of the transmitter 20 of FIG. 5A and transistors turned on at each signal level. FIG. 5B may be described with reference to FIG. 5A and redundant descriptions of similar components or operations may be omitted.

Referring to FIG. 5B, to output the first signal having the first signal level V, the transmitter 20 may turn on the first NMOS transistor NM1 of the edge MSB driver 101 and turn on the second NMOS transistor NM2 of the edge LSB driver 102. The selection drive signal may be applied to a gate terminal of the first NMOS transistor NM1 of the edge MSB driver 101, and accordingly, the first NMOS transistor NM1 may be turned on. The selection drive signal may be applied to a gate terminal of the second NMOS transistor NM2 of the edge LSB driver 102, and accordingly, the transmitter 20 may turn on the second NMOS transistor NM2.

To output the second signal having the second signal level V1, the transmitter 20 may turn on the third NMOS transistor NM3 of the middle MSB driver 103 and turn on the fourth PMOS transistor PM4 of the middle LSB driver 104. The selection drive signal may be applied to the gate terminal of the third NMOS transistor NM3 of the middle MSB driver 103, and accordingly, the third NMOS transistor NM3 may be turned on. The selection drive signal may be applied to the gate terminal of the fourth PMOS transistor PM4 of the middle LSB driver 104, and accordingly, the transmitter 20 may turn on the fourth PMOS transistor PM4.

To output the third signal having the third signal level V2, the transmitter 20 may turn on the third PMOS transistor PM3 of the middle MSB driver 103 and turn on the fourth NMOS transistor NM4 of the middle LSB driver 104. The selection drive signal may be applied to the gate terminal of the third PMOS transistor PM3 of the middle MSB driver 103, and accordingly, the third PMOS transistor PM3 may be turned on. The selection drive signal may be applied to the gate terminal of the fourth NMOS transistor NM4 of the middle LSB driver 104, and accordingly, the transmitter 20 may turn on the fourth NMOS transistor NM4.

To output the fourth signal having the fourth signal level V3, the transmitter 20 may turn on the first PMOS transistor PM1 of the edge MSB driver 101 and turn on the second PMOS transistor PM2 of the edge LSB driver 102. The selection drive signal may be applied to a gate terminal of the first PMOS transistor PM1 of the edge MSB driver 101, and accordingly, the first PMOS transistor PM1 may be turned on. The selection drive signal may be applied to a gate terminal of the second PMOS transistor PM2 of the edge LSB driver 102, and accordingly, the transmitter 20 may turn on the second PMOS transistor PM2.

Figure 6:
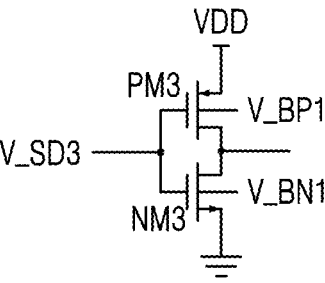
FIG. 6 is a circuit diagram of a middle most significant bit (MSB) driver of FIG. 5A.

FIG. 6 is a circuit diagram of the middle MSB driver 103 of FIG. 5A. FIG. 6 may be described with reference to FIGS. 4, 5A, and 5B, and redundant descriptions of similar components or operations may be omitted.

Referring to FIG. 6, the middle MSB driver 103 may include the third PMOS transistor PM3 and the third NMOS transistor NM3. The control circuit 300 may provide the driver 100 with the selection drive signal to select which of the edge driver 110 and the middle driver 120 is to be selected and to select a transistor to be turned on in the selected driver.

The third selection drive signal V_SD3 may be applied to the gate terminal of the third NMOS transistor NM3 of the middle MSB driver 103, and accordingly, the third NMOS transistor NM3 may be turned on.

The body bias voltage from the body bias circuit 200 may be applied to each of the body of the third PMOS transistor PM3 and the body of the third NMOS transistor NM3. For example, the body bias circuit 200 may apply the first pull-up voltage V_BP1 to the body of the third PMOS transistor PM3 and the first pull-down voltage V_BN1 to the body of the third NMOS transistor NM3.

The control circuit 300 may regulate turn-on resistance of a transistor by regulating the body bias voltage.

For example, the control circuit 300 may regulate the turn-on resistance of the third PMOS transistor PM3 by regulating the first pull-up voltage V_BP1 applied by the body bias circuit 200. As an example, the control circuit 300 may control the body bias circuit 200 to perform forward body biasing (FBB). That is, the control circuit 300 may reduce a threshold voltage of the third PMOS transistor PM3 by reducing the first pull-up voltage V_BP1. Accordingly, the control circuit 300 may reduce the turn-on resistance of the third PMOS transistor PM3 and correct the RLM of the second or third signal. As another example, the control circuit 300 may control the body bias circuit 200 to perform reverse body biasing (RBB). That is, the control circuit 300 may increase the threshold voltage of the third PMOS transistor PM3 by increasing the first pull-up voltage V_BP1. Accordingly, the control circuit 300 may increase the turn-on resistance of the third PMOS transistor PM3. Accordingly, the control circuit 300 may correct the RLM of the second or third signal.

For example, the control circuit 300 may regulate the turn-on resistance of the third NMOS transistor NM3 by regulating the first pull-down voltage applied by the body bias circuit 200. As an example, the control circuit 300 may control the body bias circuit 200 to perform FBB. That is, the control circuit 300 may decrease a threshold voltage of the third NMOS transistor NM3 by increasing the first pull-down voltage V_BN1. Accordingly, the control circuit 300 may reduce the turn-on resistance of the third NMOS transistor NM3 and correct the RLM of the second or third signal. As another example, the control circuit 300 may control the body bias circuit 200 to perform RBB. That is, the control circuit 300 may increase the threshold voltage of the third NMOS transistor NM3 by decreasing the first pull-down voltage V_BN1. Accordingly, the control circuit 300 may increase the turn-on resistance of the third NMOS transistor NM3. Accordingly, the control circuit 300 may correct the RLM of the second or third signal.

Turn-on resistance of a long channel may be expressed by the following equations.

$$R_{ON} = \frac{1}{\mu_{n,p} C_{OX} \frac{W}{L} (VDDQ - V_{th})} \qquad \text{[Equation 2]}$$

$$R_{ON} = \frac{1}{\frac{1}{2} \mu_{n,p} C_{OX} \frac{W}{L} (VDDQ - V_{th})^2} \qquad \text{[Equation 3]}$$

Equation 2 represents turn-on resistance in a linear region, and Equation 3 represents turn-on resistance in a saturation region. As may be seen from Equation 2 and Equation 3, a threshold voltage Vth is inversely proportional to the turn-on resistance of the transistor, and thus, as the threshold voltage Vth increases, the turn-on resistance decreases, and as the threshold voltage Vth decreases, the turn-on resistance increases.

In the embodiment described above, the middle MSB driver 103 includes a combination of the PMOS transistors and the NMOS transistors, but, without being limited thereto, the middle MSB driver 103 may include only PMOS transistors or only NMOS transistors. For example, in FIG. 5A, the edge MSB driver 101 may include a fifth NMOS transistor and the first NMOS transistor, the edge LSB driver 102 may include a sixth NMOS transistor and the second NMOS transistor, the middle MSB driver 103 may include a seventh NMOS transistor and the third NMOS transistor, the middle LSB driver 104 may include an eighth NMOS transistor and the fourth NMOS transistor, and an RLM compensation method of embodiments of the inventive concept may be used.

Figure 7A:
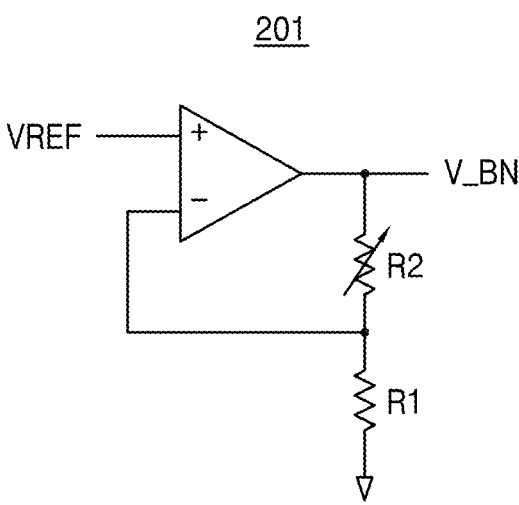
FIGS. 7A and 7B are circuit diagrams of a body bias circuit according to an embodiment of the disclosure.
Figure 7B:
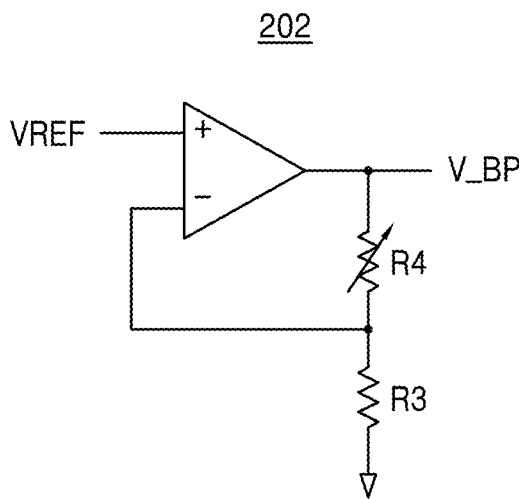

FIGS. 7A and 7B are circuit diagrams of the body bias circuit 200 according to an embodiment. FIGS. 7A and 7B may be described with reference to FIG. 3, and redundant descriptions may be omitted.

Referring to FIGS. 7A and 7B, the body bias circuit 200 may include a first body bias circuit 201 and a second body bias circuit 202.

The first body bias circuit 201 may receive a reference voltage VREF and output the body bias voltage V_BN applied to the body of the NMOS transistor.

The body bias voltage V_BN may be expressed mathematically as follows.

$$V\_BN = \frac{VREF}{R1} * R2 \qquad \text{[Equation 4]}$$

In Equation 4, R1 and R2 denote resistance and VREF denotes reference voltage. The first body bias circuit 201 may regulate the body bias voltage V_BP by regulating the resistance R2, which is a variable resistance.

The second body bias circuit 202 may receive the reference voltage VREF and output the body bias voltage V_BP applied to the body of the PMOS transistor.

The body bias voltage V_BP may be expressed mathematically as follows.

$$V\_BP = \frac{VREF}{R3} * R4 \qquad \text{[Equation 5]}$$

In Equation 5, R3 and R4 refer to resistance and VREF refers to the reference voltage. The second body bias circuit 202 may regulate the body bias voltage V_BP by regulating the resistance R4, which is a variable resistance.

The body bias circuit 200 may be implemented in various manners and is not limited to the embodiments described above.

Figure 8:
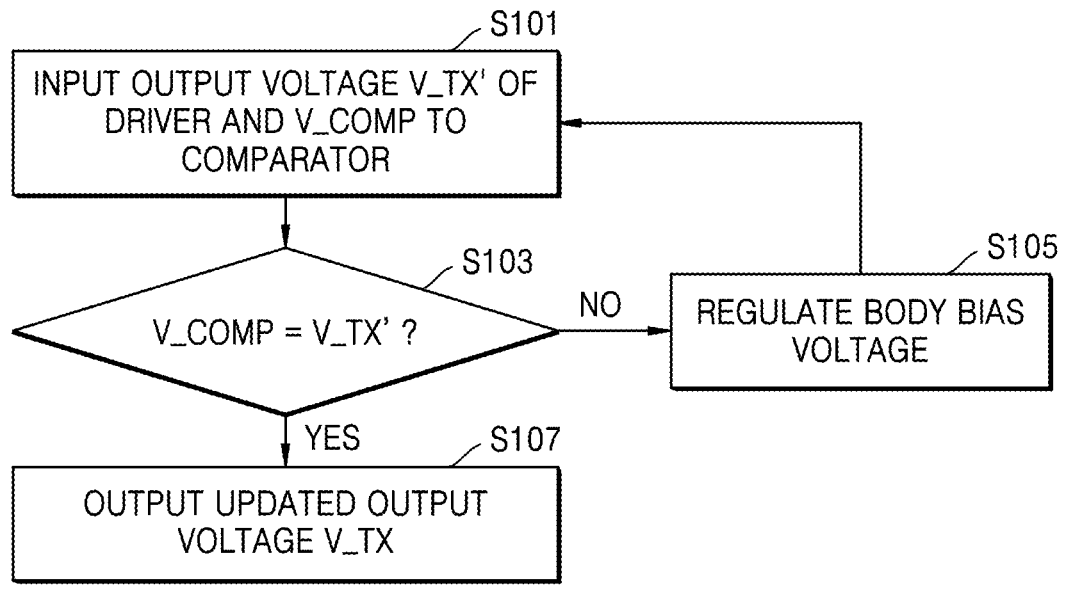
FIG. 8 is a flowchart illustrating an operation sequence of a transmitter, according to an embodiment of the disclosure.

FIG. 8 illustrates an operation sequence of the transmitter 20 according to an embodiment of the disclosure. FIG. 8 may be described with reference to FIG. 3.

Referring to FIG. 8, in operation S101, the transmitter 20 may input the output voltage V_TX' of the driver 100 and the comparison signal V_COMP to the comparator 400.

In operation S103, the comparator 400 may compare the level of the output voltage V_TX' with the level of the comparison signal V_COMP.

In operation S105, when the level of the output voltage V_TX' is different from the level of the comparison signal V_COMP (NO), the transmitter 20 may regulate the body bias voltage applied to the bodies of the transistors included in the driver 100. The transmitter 20 may input the output voltage V_TX' of the driver 100 based on the regulated body bias voltage and the comparison signal V_COMP to the comparator 400.

In operation S107, when the level of the output voltage V_TX' is equal to the level of the comparison signal V_COMP (YES), the transmitter 20 may output the updated output voltage V_TX.

Figure 9:
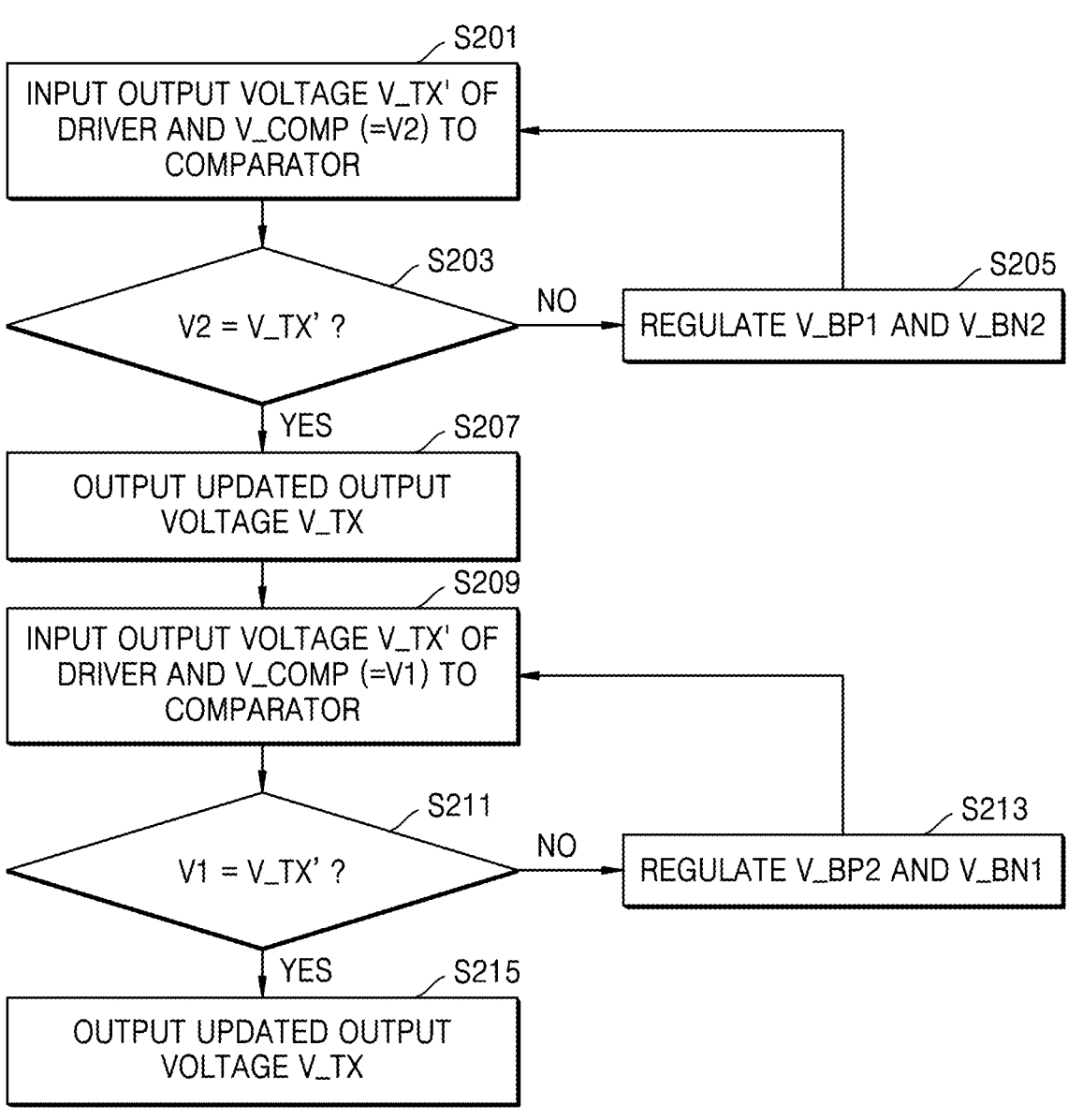
FIG. 9 is a flowchart illustrating an operation procedure of a transmitter, according to an embodiment of the disclosure.

FIG. 9 is a flowchart illustrating an operation procedure of the transmitter 20 according to an embodiment of the disclosure. FIG. 9 may be described with reference to FIGS. 3 and 5A.

Referring to FIG. 9, in operation S201, the transmitter 20 may input the output voltage V_TX' of the driver 100 and the comparison signal V_COMP to the comparator 400. Here, a signal level of the comparison signal V_COMP is the third signal level V2.

In operation S203, the comparator 400 may compare the level of the output voltage V_TX' with the level of the comparison signal V_COMP.

In operation S205, when the level of the output voltage V_TX' is different from the level of the comparison signal V_COMP (NO), the transmitter 20 may regulate the first pull-up voltage V_BP1 and the second pull-down voltage V_BN2. The transmitter 20 may input the level of the output voltage V_TX' and the level of the comparison signal V_COMP based on the regulated first pull-up voltage V_BP1 and the second pull-down voltage V_BN2 to the comparator 400.

In operation S207, if the level of the output voltage V_TX' is equal to the level of the comparison signal V_COMP (YES), the transmitter 20 may output the updated output voltage V_TX.

In operation S209, the transmitter 20 may input the output voltage V_TX' of the driver 100 and the comparison signal V_COMP to the comparator 400. Here, a signal level of the comparison signal V_COMP is the second signal level V1.

In operation S211, the comparator 400 may compare the level of the output voltage V_TX' with the level of the comparison signal V_COMP.

In operation S213, when the level of the output voltage V_TX' is different from the level of the comparison signal V_COMP (NO), the transmitter 20 may regulate the first pull-down voltage V_BN1 and the second pull-up voltage. V_BP2. The transmitter 20 may input the level of the output voltage V_TX' and the level of the comparison signal V_COMP based on the regulated first pull-down voltage V_BN1 and the second pull-up voltage V_BP2 to the comparator 400.

In operation S215, when the level of the output voltage V_TX' is equal to the level of the comparison signal V_COMP (YES), the transmitter 20 may output the updated output voltage V_TX.

Figure 10:
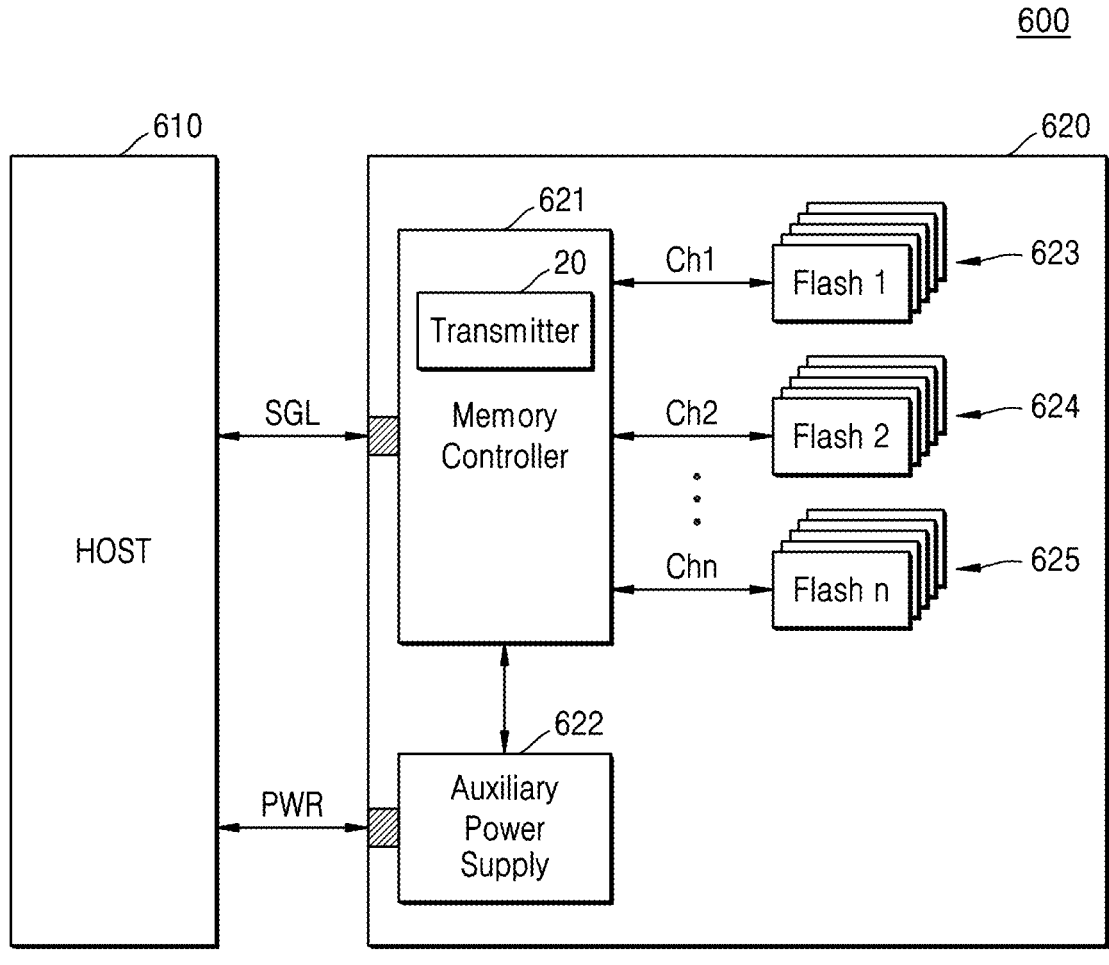
FIG. 10 is a block diagram illustrating a solid state drive (SSD) system according to an embodiment of the disclosure.

FIG. 10 is a block diagram illustrating an SSD system 600 according to an embodiment.

Referring to FIG. 10, the SSD system 600 may include a host 610 and an SSD 620. The SSD 620 may exchange signals SGL with the host 610 through a signal connector and receive power PWR from the host 610 through a power connector. The SSD 620 may include a memory controller 621, an auxiliary power supply 622, and a plurality of memory devices 623, 624, and 625.

The memory devices 623, 624, and 625 may be connected to the memory controller 621 via channels Ch1 to Chn to communicate with the memory controller 621, based on a multi-level signal transmission method according to embodiments.

Figure 11:
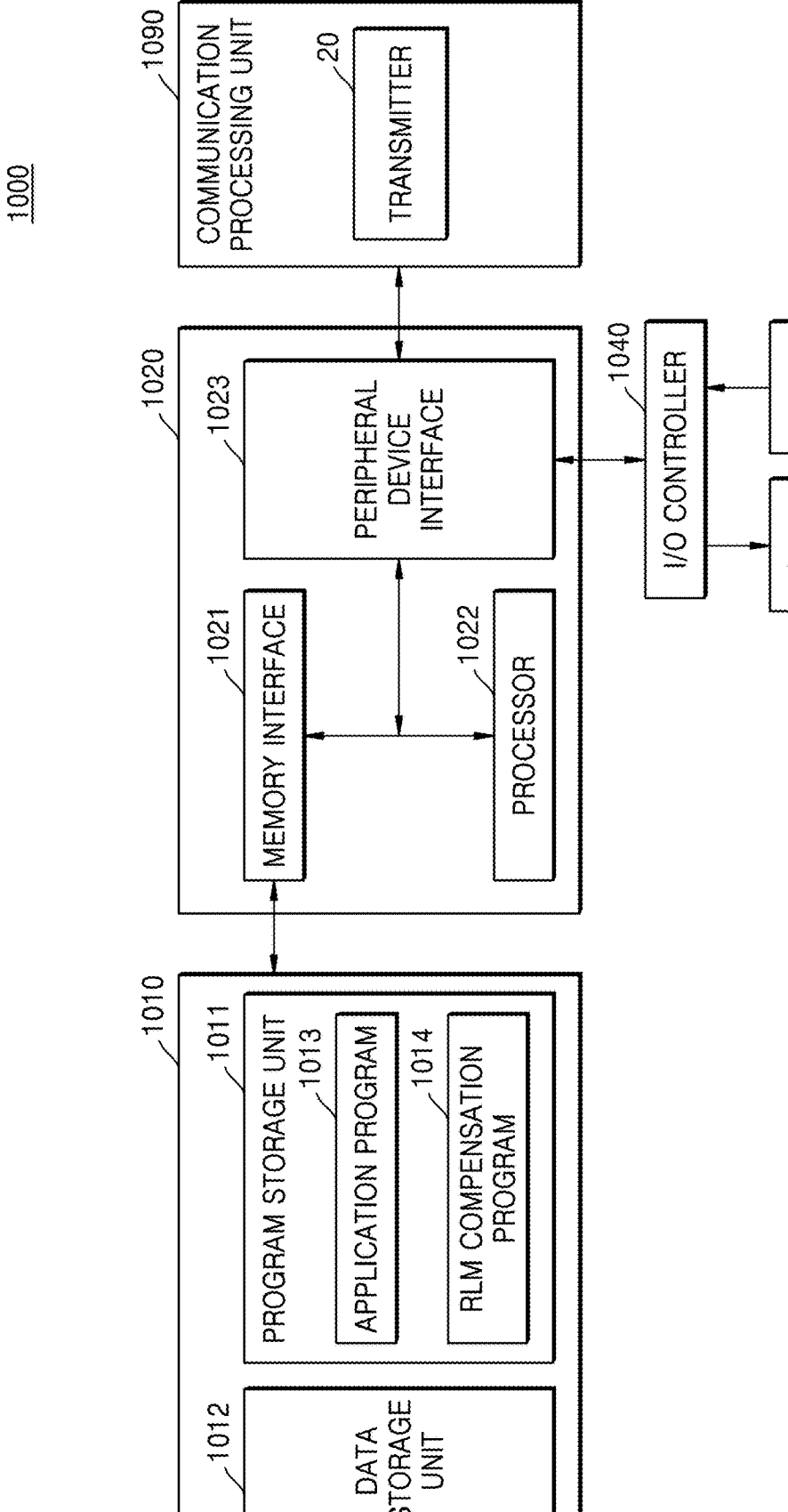
FIG. 11 is a block diagram illustrating an electronic device according to an embodiment of the disclosure.

FIG. 11 is a block diagram illustrating an electronic device 1000 according to an embodiment. FIG. 11 may be described with reference to FIG. 3.

Referring to FIG. 11, the electronic device 1000 may include a memory 1010, a processor unit 1020, an input/output (I/O) controller 1040, a display unit 1050, an input device 1060, and a communication processing unit 1090. Here, the memory 1010 may be provided in plurality. Each component is described as follows.

The memory 1010 may include a program storage unit 1011 that stores a program for controlling the operation of the electronic device 1000 and a data storage unit 1012 that stores data generated during program execution. The data storage unit 1012 may store data necessary for the operation of an application program 1013 and an RLM compensation program 1014. The program storage unit 1011 may include the application program 1013 and the RLM compensation program 1014. Here, the program included in the program storage unit 1011 may be expressed as an instruction set or as a set of instructions.

The application program 1013 includes an application program that operates in the electronic device. That is, the application program 1013 may include instructions of an application run by a processor 1022. The RLM compensation program 1014 may include instructions for compensating for the RLM of transmission signals according to embodiments.

A peripheral device interface 1023 may control connection between a peripheral device including the I/O controller 1040, the processor 1022, and a memory interface 1021. The processor 1022 controls the electronic device 1000 to provide a corresponding service using at least one software program. At this time, the processor 1022 may execute at least one program stored in the memory 1010 and provide a service corresponding to the program.

The I/O controller 1040 may provide an interface between an I/O device, such as the display unit 1050 and the input device 1060, and the peripheral device interface 1023. The display unit 1050 displays status information, input text, moving pictures, and still pictures. For example, the display unit 1050 may display application program information driven by the processor 1022.

The input device 1060 may provide input data generated by selection of the electronic device 1000 to the processor unit 1020 through the I/O controller 1040. At this time, the input device 1060 may include a keypad including at least one hardware button and a touchpad that senses touch information. For example, the input device 1060 may provide touch information, such as touch, touch movement, and touch release, detected by a touch pad to the processor 1022 through the I/O controller 1040. The electronic device 1000 may include a communication processing unit 1090 that performs communication functions for voice communication and data communication. The communication processing unit 1090 may include a transmitter 20 according to an embodiment.

While the inventive concept has been particularly shown and described with reference to embodiments thereof, it will be understood that various changes in form and details may be made therein without departing from the spirit and scope of the following claims.

What is claimed is:

1. A pulse amplitude modulation 4-level transmitter comprising:
   a driver including an edge driver that is configured to output a first signal and a fourth signal based on a selection drive signal and a middle driver that is configured to output a second signal and a third signal based on the selection drive signal and a body bias voltage;

a body bias circuit configured to provide the body bias voltage to the middle driver based on a body bias control signal;

a control circuit configured to provide the selection drive signal to the driver and to transmit the body bias control signal to the body bias circuit, based on a first comparison result or a second comparison result; and a comparator configured to provide the first comparison result of comparing a level of the second signal with a second level and to provide the second comparison result of comparing a level of the third signal with a third level;

wherein the edge driver includes an edge most significant bit (MSB) driver and an edge least significant bit (LSB) driver, and the middle driver includes a middle MSB driver and a middle LSB driver.

2. The pulse amplitude modulation 4-level transmitter of claim 1, wherein the edge MSB driver includes a first PMOS transistor and a first NMOS transistor, the edge LSB driver includes a second PMOS transistor and a second NMOS transistor, the middle MSB driver includes a third PMOS transistor and a third NMOS transistor, and the middle LSB driver includes a fourth PMOS transistor and a fourth NMOS transistor.

3. The pulse amplitude modulation 4-level transmitter of claim 2, wherein the first PMOS transistor is identical to the third PMOS transistor, and the first NMOS transistor is identical to the third NMOS transistor.

4. The pulse amplitude modulation 4-level transmitter of claim 2, wherein the second PMOS transistor is identical to the fourth PMOS transistor, and the second NMOS transistor is identical to the fourth NMOS transistor.

5. The pulse amplitude modulation 4-level transmitter of claim 2, wherein the body bias voltage includes a first pull-up voltage and a first pull-down voltage, which the body bias circuit is configured to apply to the middle MSB driver and a second pull-up voltage and a second pull-down voltage, which the body bias circuit is configured to apply to the middle LSB driver.

6. The pulse amplitude modulation 4-level transmitter of claim 5, wherein the fourth PMOS transistor and the third NMOS transistor are turned on responsive to the selection drive signal, and the middle driver is configured to output the second signal responsive to application of the second pull-up voltage to a body of the fourth PMOS transistor and application of the first pull-down voltage to a body of the third NMOS transistor.

7. The pulse amplitude modulation 4-level transmitter of claim 6, wherein the comparator is configured to perform a first operation in which the comparator compares the second signal with the second signal level and provides the first comparison result to the control circuit, the control circuit is configured to perform a second operation in which the control circuit provides a first body bias control signal to the body bias circuit based on the first comparison result, the body bias circuit is configured to perform a third operation in which the body bias circuit applies the first pull-down voltage to a body of the third NMOS transistor and the second pull-up voltage to a body of the fourth PMOS transistor, based on the first body bias control signal, and the middle driver is configured to perform a fourth operation in which the middle driver outputs the second signal; and wherein the first, second, third, and fourth operations are repeatedly performed to calibrate the second signal to be close to the second level.

8. The pulse amplitude modulation 4-level transmitter of claim 5, wherein the third PMOS transistor and the fourth NMOS transistor are turned on responsive to the selection drive signal, and the middle driver is configured to output the third signal responsive to application of the first pull-up voltage to the body of the third PMOS transistor and application of the second pull-down voltage to the body of the fourth NMOS transistor.

9. The pulse amplitude modulation 4-level transmitter of claim 8, wherein the comparator is configured to perform a first operation in which the comparator compares the level of the third signal with the third level and provides the second comparison result to the control circuit, the control circuit is configured to perform a second operation in which the control circuit provides a second body bias control signal to the body bias circuit based on the second comparison result, the body bias circuit is configured to perform a third operation in which the body bias circuit applies the first pull-up voltage to the body of the third PMOS transistor and the second pull-down voltage to the body of the fourth NMOS transistor, based on the second body bias control signal, and the middle driver is configured to perform a fourth operation in which the middle driver outputs the third signal;

wherein the first, second, third, and fourth operations are repeatedly performed to calibrate the level of the third signal to be close to the third level.

10. The pulse amplitude modulation 4-level transmitter of claim 1, wherein the edge MSB driver includes a fifth NMOS transistor and a first NMOS transistor, the edge LSB driver includes a sixth NMOS transistor and a second NMOS transistor, the middle MSB driver includes a seventh NMOS transistor and a third NMOS transistor, and the middle LSB driver includes an eighth NMOS transistor and a fourth NMOS transistor.

11. A pulse amplitude modulation 4-level transmitter comprising:

a driver including an edge driver configured to output a first signal and a fourth signal based on a selection drive signal and including an edge most significant bit (MSB) driver and an edge least significant bit (LSB) driver and a middle driver configured to output a second signal and a third signal based on the selection drive signal and one or more body bias voltages and including a middle MSB driver and a middle LSB driver;

a body bias circuit configured to provide, to the middle driver, a first body bias voltage and a second body bias voltage based on a first body bias control signal;

a control circuit configured to provide the selection drive signal to the driver and to transmit the first body bias control signal to the body bias circuit based on a first comparison result; and a comparator configured to provide the first comparison result of comparing a level of the second signal with a second level;

wherein the first body bias voltage is applied to a transistor of the middle MSB driver, the second body bias voltage is applied to a transistor of the middle LSB driver, and wherein the driver is configured to select the middle MSB driver and the middle LSB driver based on the selection drive signal and to output the second signal based on the first body bias voltage and the second body bias voltage.

12. The pulse amplitude modulation 4-level transmitter of claim 11, wherein the comparator is further configured to provide a second comparison result of comparing a level of the third signal with a third level to the control circuit, the control circuit is configured to transmit a second body bias control signal to the body bias circuit based on the second comparison result, and the body bias circuit is configured to provide, to the middle driver, a third body bias voltage and a fourth body bias voltage to the middle driver based on the second body bias control signal.

13. The pulse amplitude modulation 4-level transmitter of claim 12, wherein the driver is configured to output the third signal based on the third body bias voltage and the fourth body bias voltage.

14. The pulse amplitude modulation 4-level transmitter of claim 11, wherein the edge MSB driver includes a first PMOS transistor and a first NMOS transistor, the edge LSB driver includes a second PMOS transistor and a second NMOS transistor, the middle MSB driver includes a third PMOS transistor and a third NMOS transistor, and the middle LSB driver includes a fourth PMOS transistor and a fourth NMOS transistor.

15. The pulse amplitude modulation 4-level transmitter of claim 14, wherein the first body bias voltage is applied to a body of the third NMOS transistor, the second body bias voltage is applied to a body of the fourth PMOS transistor, the third body bias voltage is applied to the body of the third PMOS transistor, and the fourth body bias voltage is applied to the body of the fourth NMOS transistor.

16. The pulse amplitude modulation 4-level transmitter of claim 14, wherein the first PMOS transistor is identical to the third PMOS transistor, and the first NMOS transistor is identical to the third NMOS transistor.

17. The pulse amplitude modulation 4-level transmitter of claim 14, wherein the second PMOS transistor is identical to the fourth PMOS transistor, and the second NMOS transistor is identical to the fourth NMOS transistor.

18. A pulse amplitude modulation 4-level transmitter comprising:

a driver including an edge driver configured to output a first signal and a fourth signal based on a selection drive signal and including an edge most significant bit (MSB) driver and an edge least significant bit (LSB) driver and a middle driver configured to output a second signal and a third signal based on the selection drive signal and one or more body bias voltages and including a middle MSB driver and a middle LSB driver;

a body bias circuit configured to provide, to the middle driver, a first body bias voltage and a second body bias voltage based on a body bias control signal;

a control circuit configured to provide the selection drive signal to the driver and transmit the body bias control signal to the body bias circuit based on a comparison result; and a comparator configured to provide the comparison result of comparing a level of the third signal with a third level;

wherein the first body bias voltage is applied to a transistor of the middle MSB driver, the second body bias voltage is applied to a transistor of the middle LSB driver, and wherein the driver is configured to select the middle MSB driver and the middle LSB driver based on the selection drive signal and to output the second signal based on the first body bias voltage and the second body bias voltage.

19. The pulse amplitude modulation 4-level transmitter of claim 18, wherein the edge MSB driver includes a first PMOS transistor and a first NMOS transistor, the edge LSB driver includes a second PMOS transistor and a second NMOS transistor, the middle MSB driver includes a third PMOS transistor and a third NMOS transistor, and the middle LSB driver includes a fourth PMOS transistor and a fourth NMOS transistor.

20. The pulse amplitude modulation 4-level transmitter of claim 19, wherein the first PMOS transistor is identical to the third PMOS transistor, and the first NMOS transistor is identical to the third NMOS transistor.

* * * * *